United States Patent [19]
Dickirson

[11] Patent Number: 5,154,093
[45] Date of Patent: Oct. 13, 1992

[54] ADJUSTABLE CABLE END FITTING

[75] Inventor: Gene D. Dickirson, Dearborn Heights, Mich.

[73] Assignee: Ford Motor Company, Dearborn, Mich.

[21] Appl. No.: 830,775

[22] Filed: Nov. 8, 1991

Related U.S. Application Data

[63] Continuation of Ser. No. 535,208, Jun. 8, 1990, abandoned.

[51] Int. Cl.⁵ .............................................. F16C 1/10
[52] U.S. Cl. ............................ 74/501.5 R; 74/502.4; 74/500.5
[58] Field of Search ............ 74/500.5, 501.5 R, 502.4, 74/502.5, 502.6

[56] References Cited

U.S. PATENT DOCUMENTS

| | | | |
|---|---|---|---|
| 2,964,968 | 12/1960 | Millington et al. | 74/501 |
| 3,263,520 | 8/1966 | Tschanz | 74/502.4 |
| 3,263,948 | 8/1966 | Conrad | 74/502.4 X |
| 3,393,578 | 7/1968 | Tschanz | 74/501 R |
| 3,528,312 | 9/1970 | Nielsen | 74/501 R |
| 3,710,645 | 1/1973 | Bennett | 74/502.4 O |
| 4,011,770 | 3/1977 | Webb | 74/502.4 O |
| 4,023,435 | 5/1977 | LaDue | 74/501 R |
| 4,294,133 | 10/1981 | Hurley | 74/502.4 O |
| 4,452,097 | 6/1984 | Sunkel | 74/502.4 O |
| 4,635,498 | 1/1987 | Zimmermann et al. | 74/501 R |
| 4,656,880 | 4/1987 | Hildebrand et al. | 74/501 R |
| 4,676,119 | 6/1987 | Spease | 74/502.6 O |
| 4,685,350 | 8/1987 | Bauer et al. | 74/501 R |
| 4,805,479 | 2/1989 | Brightwell | 74/502.4 |
| 4,829,845 | 5/1989 | Suzuki | 74/502.4 |
| 4,841,805 | 6/1989 | Italiao | 74/500.5 X |
| 4,854,185 | 8/1989 | Lichtenberg et al. | 74/502.4 X |

Primary Examiner—David A. Scherbel
Assistant Examiner—Winnie Yip
Attorney, Agent, or Firm—Charles H. Ellerbrock; Roger L. May

[57] ABSTRACT

The present invention relates to an apparatus comprising a cable, a sheath disposed around a portion of the cable, an inner member attached to the sheath, an outer member disposed around at least a portion of the inner member. The inner member and the outer member are formed to allow stepwise longitudinal adjustment of the inner and the outer members and to allow rotational movement between the inner and the outer members.

6 Claims, 5 Drawing Sheets

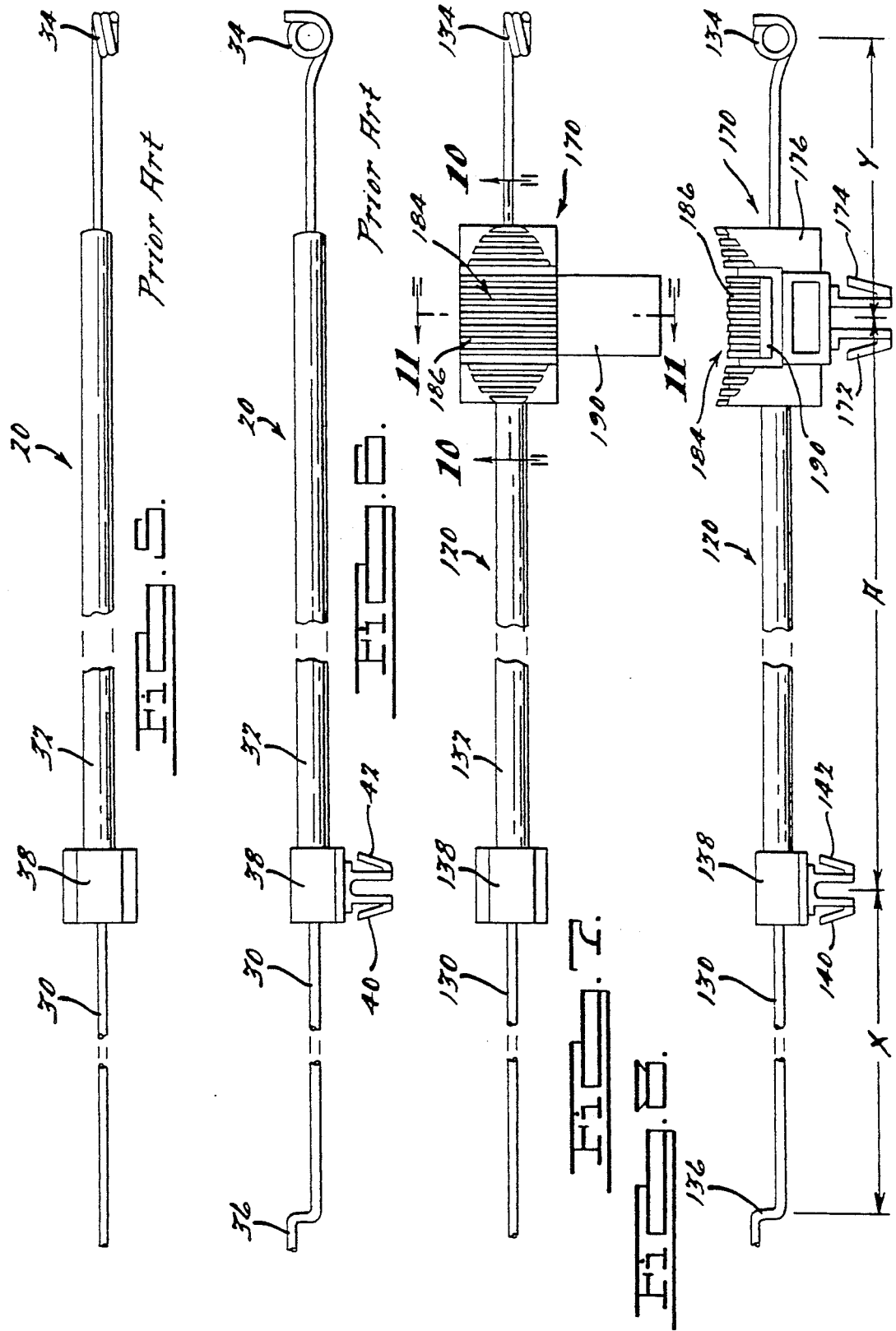

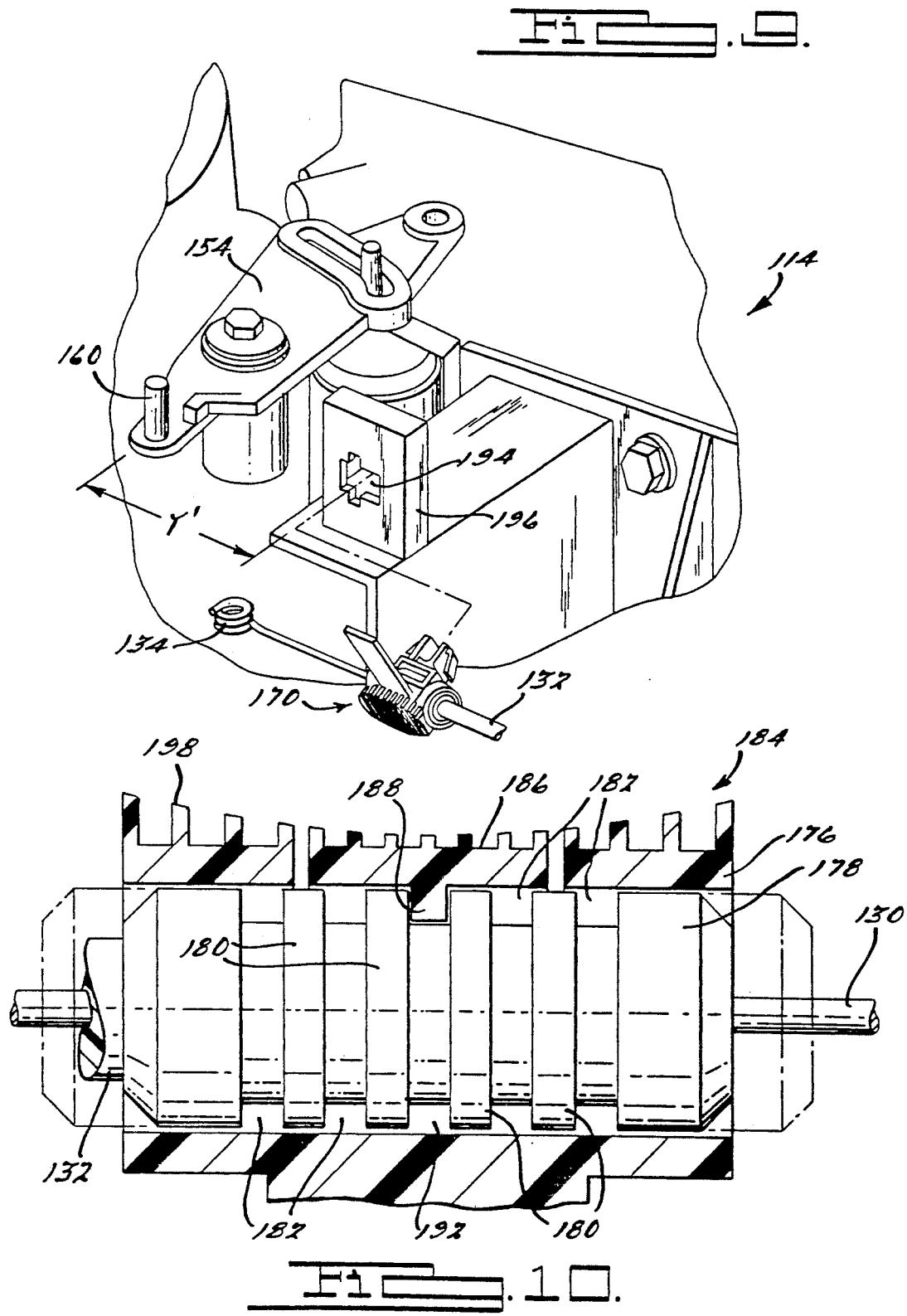

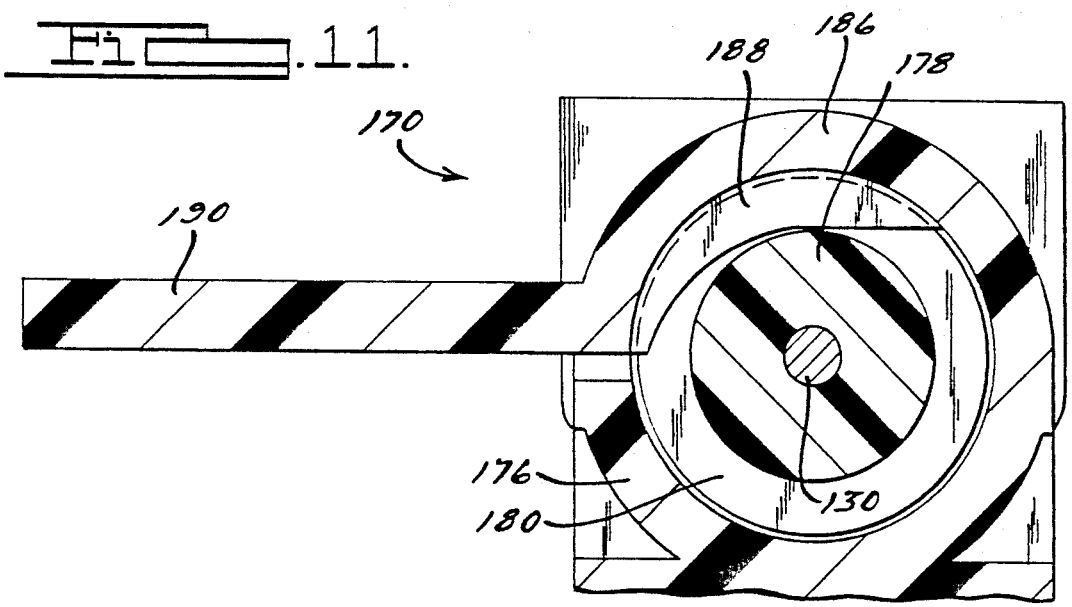
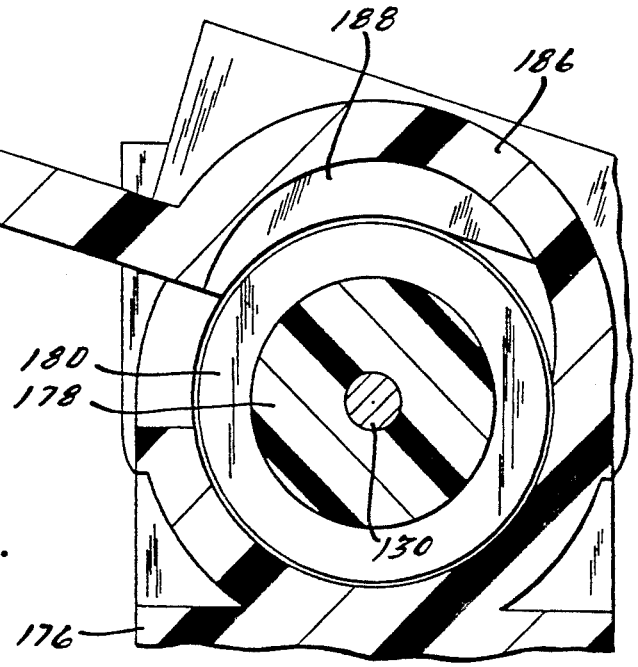

ADJUSTABLE CABLE END FITTING

This is a continuation of copending application Ser. No. 07/535,208 filed on Jun. 8, 1990.

BACKGROUND OF THE INVENTION

1. Field of the Invention

This invention relates to an adjustable cable end fitting which has automotive and non-automotive cable applications. More specifically, the adjustable cable end fitting is attached to the outer sheath of a control cable and allows adjustable placement of the end of the cable sheath relative to the cable.

2. Discussion of the Related Art

Force transmitting cables are used to transmit mechanical forces between various devices. One application of these control cables is used in an automotive heater-air conditioner application. The cables are used to transmit mechanical forces between the control lever on the instrument panel and the temperature/mode function doors in the air distribution plenum. In most cases, the forces are transmitted along a curved path between these components. Typically the cable or conduit is secured to an apertured end fitting having a flange or other mechanism thereon which is adapted to be attached to a support structure and the cable movably disposed within the conduit and the end fitting.

The conduit or sheath is suitably secured at opposite ends to the support structure of the vehicle and is arranged so that the end of the cable may be attached to the element to be controlled while the opposite end of the cable is attached to a cntrolling member such as a knob or a lever located on the instrument panel. While the normal force transmitting member is a cable, other force transmitting members are possible and are contemplated by this invention.

In several known systems, the end fitting was normally provided with a mounting aperture in a flange portion thereof so as to permit mounting by means of a screw or other means to a suitable support member of the vehicle. In this type of system, a screw was necessary to attach the end fitting to the support member and thus an additional tool was required for installation of the end fitting. These systems did not allow for easy, tool free adjustment of the cable sheath relative to the cable member. Depending on the assembly fixtures, devices or procedures used it was possible for these cable systems to be improperly positioned relative to the lever or knob which the user push, pulled or rotated to select the desired mode or temperature of heating or air conditioning.

Systems were developed to rigidly position the doors and levers with respect to each other with the intent of ensuring the proper relationship to each other during assembly. One such system currently used today is known as the pin and lever positioning device or the "J-clip" system. This system, which will be described in further detail below with reference to some of the figures, includes a cable having one fixed end fitting attached to one end of the sheath and the other end of the sheath is positionable within a J-clip attached to a structure of the vehicle. Installation of this system requires that the control lever is held in a fixed position prior to and during installation as well as holding the mechanism which operates the door in a fixed position.

Problems occur with this system because the operator can inadvertently push or pull the cable conduit while attempting to press the sheath into the J-clip. This results in an incorrectly adjusted cable which prevents the temperature lever from traveling to both ends of its travel. It is also possible for the operator installing the system to fail to press the cable sheath fully into the J-clip and this results in the cable popping out of the J-clip and thus an inoperative lever or door.

With the J-clip system as well as other systems it is possible for the control lever positioning devices to become distorted and this can result in an improperly adjusted cable.

Another problem with the J-clip system is that the operator may fail to remove the mechanism which locks the door in its initial predetermined position. If this occurs, the control lever will not operate because it is locked in place by the door.

Another adjustable cable end fitting is disclosed in U.S. Pat. No. 4,805,479 (Brightwell) assigned to the assignee of the present invention. This adjustable cable end fitting has a first channel shaped member having resilient ribs and limbs on its inner surface and is connectable to the fixed structure of the vehicle. It also includes a second member in the form of a sleeve which fits over the outer sheath of the cable and has ribs on its outer surface. The sleeve is retained in the channel by the resilient limbs and also by an interlocking engagement with the ribs. This prevents relative longitudinal movement between the sleeve and the channel shaped member.

This device is intended to have the regulating valve or heater door held in a position corresponding to the indicated setting on the instrument panel. As in the J-clip device, it is possible for this initial positioning member to become distorted during handling or assembly operations resulting in a misadjusted cable after the positioning member is removed.

Further, since the limbs include a return portion or barb, the stated purpose of which is to inhibit removal of the sleeve from the channel after assembly, adjustment is extremely difficult after the sleeve is assembled in the channel shaped member.

This device also does not allow complete rotation over 360° between the inner and outer member. Thus torsional forces on the sheath, which are induced by the twisted path that the cable and sheath must go through, cannot be readily relieved and this inhibits the assembly process.

Even though the intention of the Brightwell patent is to inhibit removal of the sleeve from the channel member, it has been found that the sleeve can be inadvertently pulled from the channel member during assembly.

Thus it is seen that many problems remain when installing cables with or without adjustment features in the end fittings.

SUMMARY OF THE INVENTION

The present invention seeks to overcome many of the difficulties found in other cable end fittings. The adjustable cable end fitting of the present invention is designed so that it does not require the alignment of the instrument panel control lever with the heater door to ensure proper adjustment of the cable. It is intended to permit free longitudinal travel of the inner member relative to the outer member after assembly if and only if a tab attached to the outer member is deflected. This allows a stepwise adjustment of the cable end fitting and thus the end of the sheath relative to the cable end.

The adjustable cable end fitting of the present invention allows a very easy adjustment after assembly and no hand tools are required to assemble the end fitting or make the necessary adjustments.

The structure of the adjustable end fitting is designed so that a portion of the outer member completely encircles or surrounds a portion of the inner member. This makes it extremely difficult for the inner member to be pulled out of the outer member without fracturing the outer fitting. Since the outer member and the inner member can be made from a robust plastic material, the adjustable end fitting can sufficiently withstand all of the assembly operations and normal operating forces.

The present invention is also designed so that the inner member and the outer member can be completely rotated relative to one another and even allow the inner member to be rotated 360° within the outer member after the outer member is snapped or attached into a structure of the heater plenum assembly.

Since the inner member can freely rotate within the outer member at all times, it expedites assembly because the end fitting is always aligned in the operator's hand with no torsional forces to overcome. It also prevents any torsional stresses in the cable conduit thereby eliminating one source of high push-pull forces on the sliding cable.

Assembly does not require the previously needed lever positioning devices for the instrument panel levers or the pin which positions the damper or plenum door. This makes it possible to reduce the manufacturing time and expense involved with assembling the cable.

The present invention also allows for the outer member to be easily snapped in during assembly to the plenum. This therefore removes a previous failure mode of the operator pushing or pulling on the cable sheath when inserting the sheath into the J-clip and the resultant cable misadjustment.

Different colors are utilized between the inner and the outer members which allows instantaneous visual verification that the parts are properly assembled.

The inner member contains ribs with grooves therebetween for predetermining the amount of stepwise adjustment which is allowed between the inner member and the outer member.

The adjustable cable end fitting assembly of the present invention is applicable to many other automotive and non-automotive applications, however, it is described in connection with the heater-air conditioner application for ease in understanding.

BRIEF DESCRIPTION OF THE DRAWINGS

FIGS. 5 and 6 illustrate top and side views, respectively, of a known prior art cable and sheath construction with one end of the sheath containing the non-adjustable snap-in end fitting and the other end capable of placement inside a J-clip assembly.

FIGS. 7 illustrates a top view of a control cable having an adjustable end fitting according to a preferred embodiment of the present invention.

FIG. 8 illustrates a side view of the control cable shown in FIG. 7 having the adjustable end fitting according to a preferred embodiment of the present invention.

FIG. 9 illustrates a view similar to FIG. 2 indicating the placement of the adjustable end fitting according to the present invention.

FIG. 10 illustrates a cross sectional view taken along line 10—10 in FIG. 7 showing the adjustable end fitting according to the present invention.

FIG. 11 illustrates a cross sectional view taken along line 11—11 in FIG. 7 showing the adjustable end fitting according to the present invention.

FIG. 12 illustrates a view similar to FIG. 11, indicating the position of the outer member so that longitudinal adjustment of the cable sheath relative to the end of the cable can be accomplished.

DETAILED DESCRIPTION OF THE PREFERRED EMBODIMENTS

Figure 1:
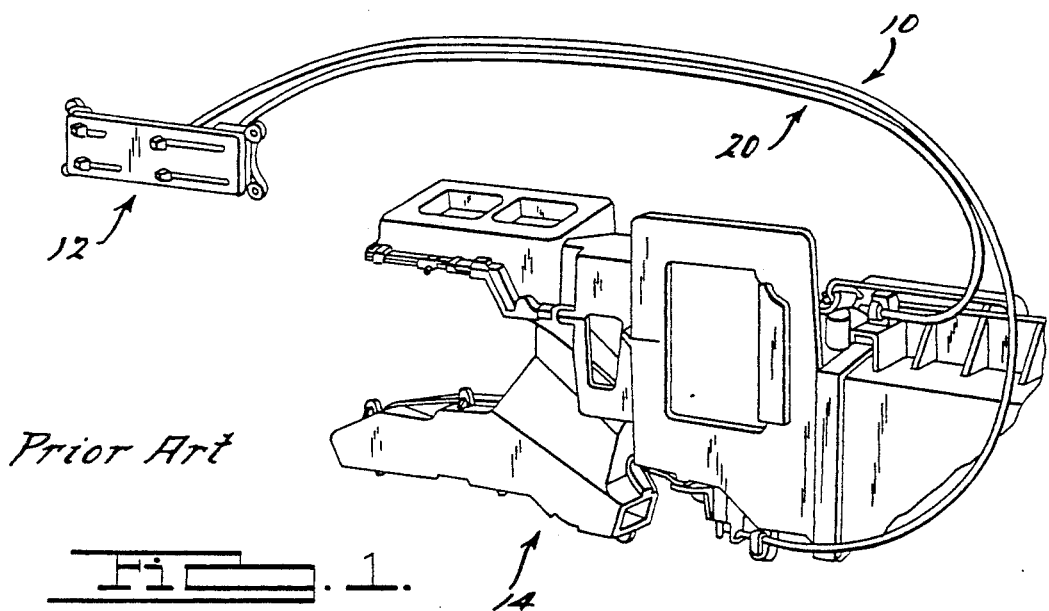
FIG. 1 illustrates a perspective view of a known overall system showing the control cables connected to the instrument panel control head and the heater plenum assembly.

FIG. 1 illustrates the general overall system having control cables 10 and 20 attached to an instrument panel heater and A/C control head 12 and the other ends of the cables 10 and 20 connected to a heater plenum assembly 14.

Figure 2:
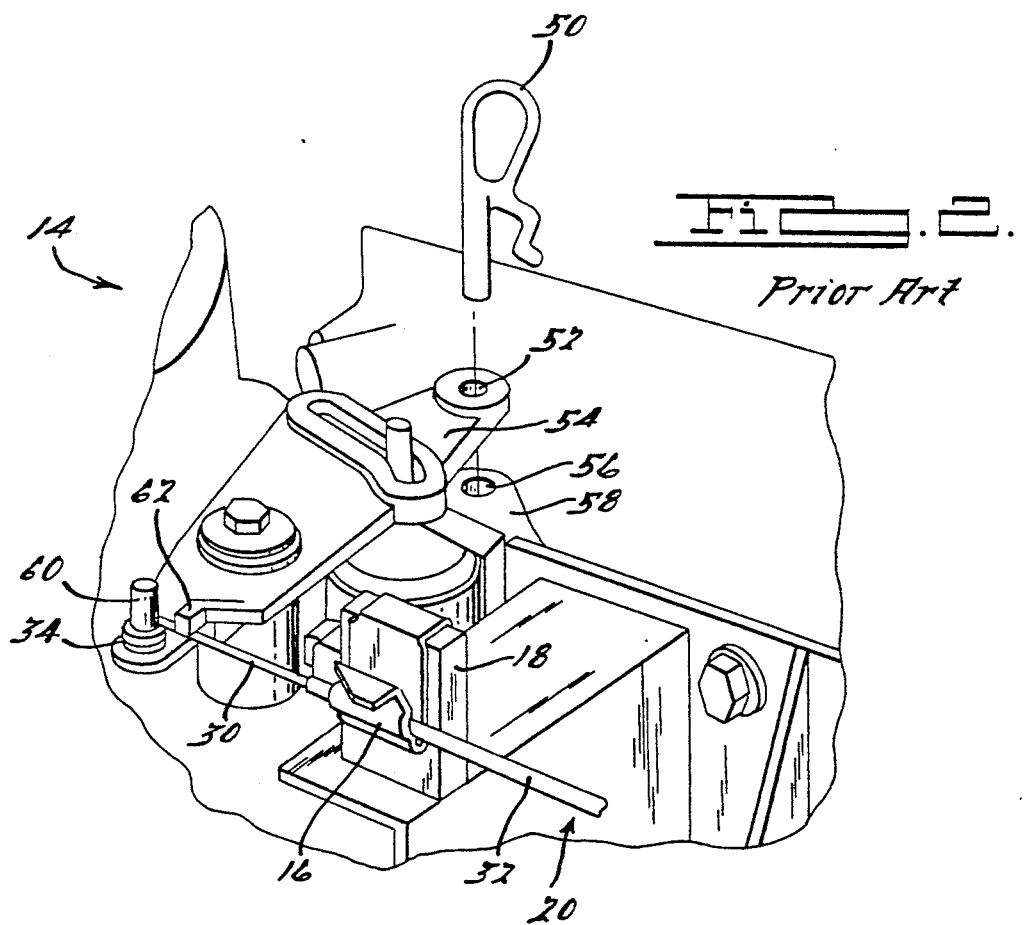
FIG. 2 illustrates an enlarged view of a portion of FIG. 1 showing the cam positioning device connected to the plenum damper controls illustrating a known prior art J-clip system.

FIG. 2 illustrates a known adjustable cable end fitting assembly and is shown in an exploded view of the connection of the control cable 20 to the heater plenum assembly 14. Specifically the adjustable end fitting shown includes an end of a sheath 32 in a J-clip 16 attached to a part 18 of the heater plenum assembly 14.

Figure 3:
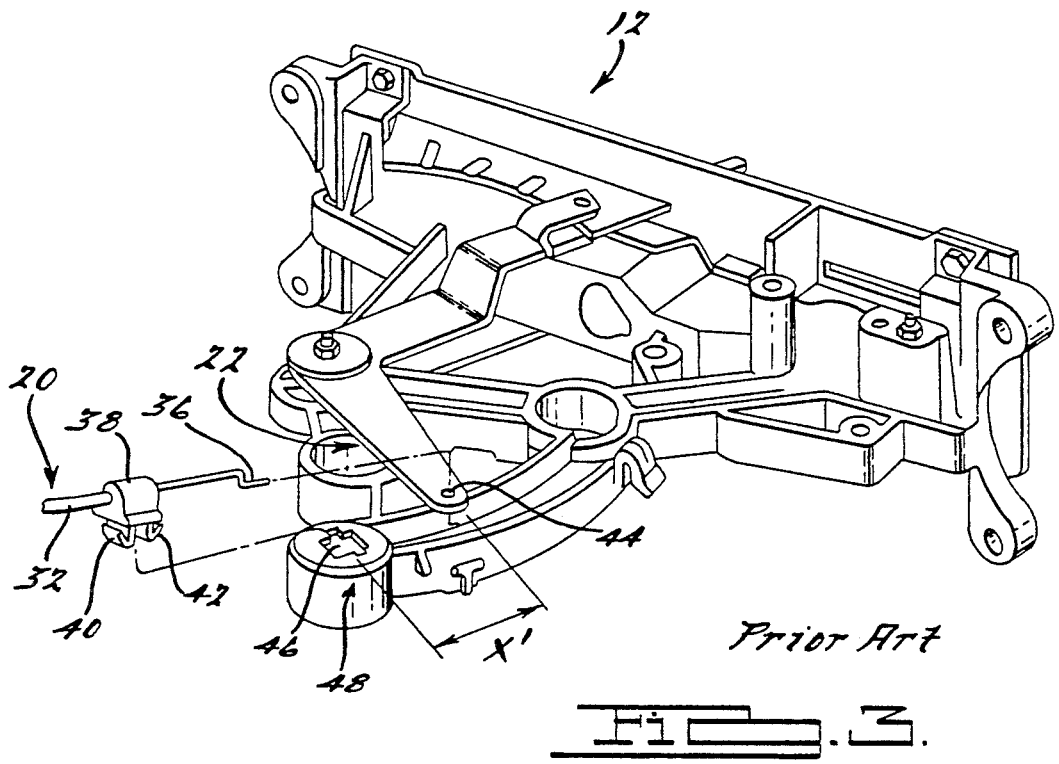
FIG. 3 illustrates an enlarged perspective view of the rear side of the instrument panel control head showing the known prior art connection between the non-adjustable cable end fitting and the control lever.

FIG. 3 illustrates the controls on the back of the instrument panel control head 12 and the attachment of the control cable 20 to the control lever 22. The exact method of assembly will be described below.

Figure 4:
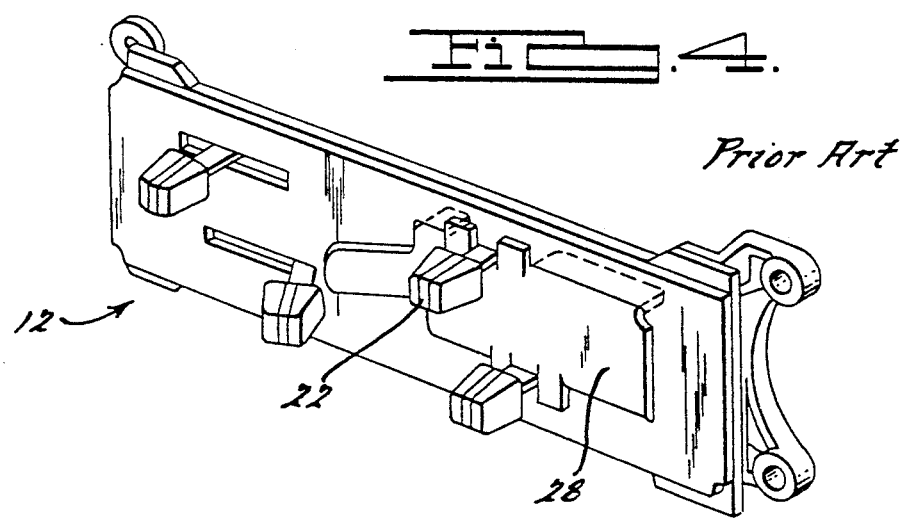
FIG. 4 illustrates an enlarged perspective view of the instrument panel control head showing the prior art lever positioning device in place prior to the control cable assembly.

FIG. 4 illustrates the front of the instrument panel control head 12 showing the control lever 22 held in an initial position by a known lever positioning device 28.

FIGS. 5 and 6 illustrate a known control cable having an inner movable cable portion 30 and a sheath 32 surrounding a portion of the cable 30. One end of the cable 30 includes a "pigtail" 34 and the other end of the cable includes a "z-bend" 36. The sheath 32 has attached at one end a fixed non-adjustable end fitting 38. The fixed end fitting 38 includes flexible arms 40 and 42 for attaching the fixed end fitting 38 to the structure of the instrument panel control head 12.

Preparation of the instrument panel control head 12 and the heater plenum assembly 14 must occur prior to installation of the cable 20. This preparation includes placing a lever positioning device 28 in a position as shown in FIG. 4 to predetermine the location of the control lever 22 in a fixed position. Likewise, the heater plenum 14 must have the cam which determines the damper door position fixed initially before cable insertion. This is accomplished as shown in FIG. 2 by placing a cam positioning pin 50 in an aperture 52 of control cam 54 and in through an aperture 56 in a fixed portion 58 of the heater plenum assembly 14.

Assembly of the prior art control cable 20 can now be accomplished and it is described with reference to FIGS. 2-4. The first step in the assembly procedure is to position the z-bend 36, as shown in FIG. 3, into a hole 44 in the control lever 22. Following this the fixed end fitting 38 is snapped into an aperture 46 in a control head bracket 48 such that the flexible arms 40 and 42 deform along the edges of the aperture 46 to allow insertion and then expand to prevent removal of the fixed end fitting 38.

The next step is to attach the pigtail 34, shown in FIG. 2, to a pin 60 located on one end of the control cam 54. The control cable 30 is then moved so that it is located under an arm 62 of the control cam 54. This procedure locks the pigtail 34 down and prevents the end of the cable 30 from becoming dislodged. The operator then grasps the sheath 32 and places it into the J-clip 16. Once this is accomplished the cam positioning pin 50 can be removed and discarded and the lever positioning device 28 shown in FIG. 4 can also be removed and discarded. Following removal of the pin 50 and the lever positioning device 28, the assembly process is completed.

There are numerous failure modes associated with this system. Firstly, the operator can inadvertently push or pull on the cable sheath 32 while pressing the cable sheath 32 into the J-clip 16. This results in a misadjusted cable and prevents the temperature lever from moving to both ends of its travel because the sheath 32 is not in the proper relationship with the cable 30 due to an incorrect length of cable 30 projecting from the sheath 32.

It is possible that the operator can fail to fully press the cable sheath 32 into the J-clip 16. This can allow the cable 20 to "pop out" of the J-clip 16 resulting in an inoperative door.

It is also possible for the lever positioning device 28 to become distorted or dislodged during handling or assembly operations. This would cause the control lever 22 to be incorrectly positioned which in turn incorrectly positions the pigtail 34 with respect to the sheath 32 and thus the cable is improperly adjusted after assembly.

Additionally it is possible for an operator to fail to remove and discard the cam positioning pin 50 which would result in the control cam 54 becoming locked and a damper door frozen in its initial predetermined position.

The present invention will know be described in connection with FIGS. 7-12. Parts which are similar to those previously described will use a reference numeral "1" in front of the reference numeral used before.

FIGS. 7 and 8 illustrate a control cable 120 having an inner cable 130 which is partially surrounded by a sheath 132. Like the cable described earlier, there is a pigtail 134 at one end and a z-bend 136 at the opposite end of the cable 130. There is also a fixed end fitting 138 having flexible arms 140 and 142 for insertion into a control head bracket aperture 46 as shown in FIG. 3.

The present invention includes an adjustable end fitting 170 attached to the other end of the sheath 132. The adjustable end fitting 170 includes flexible arms 172 and 174 similar to those used in the fixed end fitting 138.

As shown in FIGS. 10-12, the adjustable end fitting 170 includes an outer member 176 and an inner member 178. The inner member 178 is substantially cylindrically shaped with ribs 180 and grooves 182 formed in the outer surface thereof. The inner member 178 is attached to the sheath 132 by any number of known methods such that it is in a fixed position relative to the end of the sheath 132. It is not necessary for the sheath 132 to extend completely through the inner member 178 and in fact it is only required that the sheath 132 extend into the inner member 178 a distance sufficient to withstand assembly or operating forces.

The outer member 176 includes a substantially curved top surface 184 for allowing the operator's thumb or finger to conform thereto for easy insertion of the adjustable end fitting 170 into the structure of the heater plenum assembly.

The outer member 176 also includes a first portion 186 which is relatively movable to a second portion of the outer member 176. This first portion 186 includes a tab or surface projection 188 on the inner surface of the outer member 176. This tab 188 engages with the grooves 182 in the inner member 178 to prevent longitudinal movement of the outer member 176 relative to the inner member 178.

Adjustment of the end fitting 170 relative to the end of the cable pigtail 134 is accomplished by the operator moving a deflectable lever 190. The deflectable lever 190 is connected to the relatively movable portion 186 and allows the top portion thereof to be rotated upwards as shown in FIG. 12. This allows the tab 188 to be lifted out of the groove formed in the inner member 178. It is then possible for the operator to slide the inner member 178 relative to the outer member 176 to stepwise adjust the relative longitudinal positions of these two members. When the stepwise adjustment is made, the operator releases the force on the deflectable lever 190 and the tab 188 comes to rest in a new groove 182.

The present invention is intended to replace the J-clip and other adjustable prior art designs because of their inherent problems. It is also intended to replace the cam positioning pin and lever positioning device for initial placement of the cable.

The inner member 178 is attached to the cable sheath 132 using traditional manufacturing methods such as insert molding or spin welding. The outer member 176 is attached to the inner member 178 by deflecting the lever 190 and sliding the outer member 176 over the inner member 178. When the ends of the two fittings are flush, the lever 190 is released and the tab 188 on the inner wall of the outer member 176 slides into the central groove 192 in the inner member 178. The inner member 178 and the outer member 176 are molded in contrasting colors, for example, red and white, which permits rapid visual verification that the two parts are properly aligned at their ends.

The z-bend 136 and the pigtail 134 are formed at the end of the cable 130 using traditional methods known to those skilled in the art.

Three variables affect the door positions with respect to the control lever 22 position:

1) The location of the z-bend hole 44 in the control lever 22 with respect to the aperture 46 in the control bracket 48 for the fixed end fitting 138 to snap into and this is indicated by dimension X' in FIG. 3. It is noted that the present invention utilizes the same control lever system and control head bracket as described in connection with the J-clip system above.

2) The location of the pin 160 on the temperature control cam 154 with respect to the aperture 194 in the plenum 114 for the adjustable end fitting to snap into and this is designated as dimension Y' in FIG. 9.

3) Dimension Y on the cable assembly shown in FIG. 8 as the distance between the midpoint of the adjustable end fitting 170 and the pigtail 134 can also vary (since dimension X is a gage dimension and is fixed).

Therefore by ensuring that dimension X on the cable as shown in FIG. 8 matches X' shown in FIG. 3 and that dimension Y on the cable matches Y' shown in FIG. 9, the control cable system will be in correct calibration after assembly. Establishing and maintaining the matching dimensions is accomplished through statistical process control using methods known to those skilled in the art.

In the event that at least one dimension X, X', Y, or Y' falls outside its normal statistical value, the lever/door relationship will not be correct. This will result in a cable being misadjusted. It is therefore desirable to be able to alter the dimension Y on the cable after it is installed. This can be accomplished with the present invention by lifting the deflectable lever 190 and sliding the inner member 178 left or right one or two grooves as needed and then releasing the force on the lever 190.

The dimensions listed above could fall outside the normal blueprint tolerance condition for at least four reasons: The first reason is that the foam seal on the door, located inside the plenum and not shown, could be distorted. The second reason is that the end of the control arm 22 could be bent and therefore X' is an incorrect value. The third reason is that the cable sheath 120 could be too short and thus dimension Y is too long. The fourth reason is that the door inside the plenum could be warped. If any of these conditions happen in the existing J-clip design, the operator or a service technician at a later time, must pry the sheath 32 from the J-clip 16 and replace it into the J-clip 16 at a different location. In the J-clip design, there is also another failure mode condition and this exists when the cable sheath 32 is push or pulled when it is put in the J-clip during assembly.

Dimension A shown in FIG. 8 is between the two end fittings 138 and 170 and is a fixed dimension dependent upon the particular application utilized. Dimension A is not critical to the adjustment between the sheath 132 and the cable end 134.

In the preferred embodiment of the present invention, the upper surface of the outer member includes fins 198. These fins 198 are provided to seek a uniform wall thickness and avoid the situation where a heavy wall is formed on the upper surface of the outer member 176 since this can cause distortion due to uneven internal stresses during the plastic molding and curing process. The shape of the fins 198 are carefully formed to provide the assembly operator with a comfortable thumb pad to push on. The pad also assists the operator to align the flexible arms 172 and 174 with the aperture 194.

The grooves 182 are provided in the inner member at a distance such that they are thin enough to permit stepwise adjustment through several positions. The ribs 180 are designed so that they are thick enough to withstand normal operating forces on the system and prevent longitudinal movement. It has been found that approximately 1 mm between the grooves is useful to meet these goals.

Assembly of the cable with the adjustable end fitting 170 is accomplished as follows: The procedure is identical to that of installing the cable in the J-clip system described above except that instead of attaching the cable sheath into the J-clip, the adjustable end fitting 170 can be snapped into the aperture 194 in bracket 196. It is not necessary to carefully align and hold the control lever 22 relative to the control cam 54. If any further adjustment is needed, the procedure for adjusting the outer member 176 relative to the inner member 178 described above can be utilized.

Thus it can be seen that this system does not require the lever positioning device 28 or the cam positioning pin 50 described above. The present invention also provides for the adjustment of the cable sheath relative to the end fitting with a minimum of effort and thus expedites the adjustment process.

In view of the disclosure, many modifications of this invention will be apparent to those skilled in the art. It is intended that all such modifications which fall within the true scope of this invention be included within the terms of the appended claims.

What is claimed is:

1. Apparatus, comprising:
   a cable;
   a sheath disposed around a portion of said cable; and
   an adjustable end fitting, comprising:
   an inner member attached to one end of said sheath and disposed around at least a portion of said cable, said inner member including a plurality of grooves formed on the outer surface thereof;
   an outer member surrounding at least a portion of said inner member, said outer member adapted to be coaxially rotatable relative to said inner member, said outer member including a flexible first portion attached thereto having a tab for engaging said grooves of said inner member for fixing the longitudinal position of said outer member relative to said inner member, said first portion including a lever affixed thereto for deflecting said first portion and tab radially outwardly about an axis parallel to the axes of said outer member away from engagement with said grooves of said inner member upon the application of force against said lever,
   said lever, first portion, tab, and grooves cooperating to provide for stepwise longitudinal adjustment of the position of said outer member relative to said inner member.

2. Apparatus as defined in claim 1, wherein said stepwise longitudinal adjustment is among a plurality of discrete positions.

3. An apparatus as defined in claim 1, wherein said outer member is concentrically disposed around said inner member.

4. Apparatus as defined in claim 1, wherein said grooves are defined by a ribbed surface.

5. Apparatus according to claim 4, wherein said ribbed surface includes ribs having a rectangular cross section.

6. Apparatus as defined in claim 1, wherein said outer member includes a curved outer surface for allowing ease of assembly.

* * * * *